(12) United States Patent
Filipczak et al.

(10) Patent No.: US 9,969,339 B2
(45) Date of Patent: May 15, 2018

(54) DEVICE, TRIM ELEMENT FOR THE DEVICE, AND METHOD OF FORMING THE TRIM ELEMENT

(71) Applicant: GM GLOBAL TECHNOLOGY OPERATIONS LLC, Detroit, MI (US)

(72) Inventors: Larry A. Filipczak, West Bloomfield, MI (US); Ninetta M. Vieceli, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 15/077,170

(22) Filed: Mar. 22, 2016

(65) Prior Publication Data

US 2016/0280153 A1 Sep. 29, 2016

Related U.S. Application Data

(60) Provisional application No. 62/137,419, filed on Mar. 24, 2015.

(51) Int. Cl.
| | |
|---|---|
| *E06B 7/22* | (2006.01) |
| *B60R 13/04* | (2006.01) |
| *B60R 13/08* | (2006.01) |
| *B60R 13/06* | (2006.01) |
| *B60J 10/17* | (2016.01) |
| *B60J 10/24* | (2016.01) |
| *B60J 10/32* | (2016.01) |
| *B60J 10/86* | (2016.01) |

(52) U.S. Cl.
CPC .............. *B60R 13/04* (2013.01); *B60J 10/17* (2016.02); *B60J 10/24* (2016.02); *B60J 10/32* (2016.02); *B60J 10/86* (2016.02); *B60R 13/06* (2013.01); *B60R 13/08* (2013.01)

(58) Field of Classification Search
CPC .......... B60R 13/08; B60R 13/04; B60R 13/06
USPC .............................................. 49/490.1, 498.1
See application file for complete search history.

(56) References Cited

U.S. PATENT DOCUMENTS

| | | | | |
|---|---|---|---|---|
| 5,433,038 | A * | 7/1995 | Dupuy ................ | B60R 13/0206 49/377 |
| 5,511,343 | A * | 4/1996 | Guillon ................ | B60J 10/248 49/475.1 |
| 5,519,968 | A * | 5/1996 | Dupuy ................ | B60J 10/235 49/377 |

(Continued)

OTHER PUBLICATIONS

Muller, "Fluid Sealing Technology Principles and Applications", CRC Press, 1998.

*Primary Examiner* — Jerry E Redman
(74) *Attorney, Agent, or Firm* — Quinn IP Law

(57) ABSTRACT

A trim element for a device includes a substrate formed from a material. The material has a first coefficient of static friction and a first coefficient of kinetic friction with respect to the device. The trim element includes a cured film disposed on the substrate and formed from a coating composition. The cured film has a second coefficient of static friction that is greater than the first coefficient of static friction and a second coefficient of kinetic friction that is greater than the first coefficient of kinetic friction. A device includes a body and the trim element attached to the body. In one embodiment, the device includes a component attached to the body and pivotable between an open position and a closed position.

20 Claims, 2 Drawing Sheets

(56) References Cited

U.S. PATENT DOCUMENTS

| | | | | |
|---|---|---|---|---|
| 8,051,607 B2* | 11/2011 | Okajima | ............... | B29C 47/003 |
| | | | | 49/490.1 |
| 8,225,554 B2* | 7/2012 | Nozaki | .................... | B60J 10/24 |
| | | | | 49/475.1 |
| 8,313,135 B2* | 11/2012 | Iida | ........................ | B60R 13/04 |
| | | | | 296/146.9 |
| 8,793,934 B2* | 8/2014 | Sato | ........................ | B60R 13/04 |
| | | | | 296/146.2 |
| 8,829,115 B2* | 9/2014 | Hermel-Davidock | .. | C08F 10/00 |
| | | | | 525/240 |
| 9,018,329 B2* | 4/2015 | Yang | ..................... | C08F 110/02 |
| | | | | 526/352 |
| 9,027,284 B2* | 5/2015 | Murree | ................. | E06B 7/2314 |
| | | | | 49/441 |
| 9,102,128 B2* | 8/2015 | Manrique | ............... | B32B 27/32 |
| 9,174,519 B2* | 11/2015 | Murree | ..................... | B60J 10/24 |
| 9,284,391 B2* | 3/2016 | Hlavinka | ............... | C08F 110/02 |
| 9,360,113 B2* | 6/2016 | Oohinata | ............... | B32B 15/046 |
| 2001/0033927 A1* | 10/2001 | Omori | ..................... | B32B 25/08 |
| | | | | 428/317.1 |
| 2006/0188678 A1* | 8/2006 | Ohlsson | ..................... | B32B 7/02 |
| | | | | 428/35.7 |
| 2008/0110102 A1* | 5/2008 | Hotta | ................. | B29C 47/0023 |
| | | | | 49/498.1 |
| 2008/0122251 A1* | 5/2008 | Okajima | ................. | B60J 10/24 |
| | | | | 296/146.9 |
| 2014/0109485 A1* | 4/2014 | Murree | .............. | B29D 99/0053 |
| | | | | 49/498.1 |

\* cited by examiner

DEVICE, TRIM ELEMENT FOR THE DEVICE, AND METHOD OF FORMING THE TRIM ELEMENT

CROSS-REFERENCE TO RELATED APPLICATIONS

This application claims the benefit of U.S. Provisional Patent Application No. 62/137,419, filed on Mar. 24, 2015, the disclosure of which is hereby incorporated by reference in its entirety.

TECHNICAL FIELD

The disclosure relates to a trim element for a device and to a method of forming the trim element for the device.

BACKGROUND

Trim elements may be useful for decorative and/or functional applications for devices. For example, trim elements such as body moldings and extruded ornamentation may be attached to a body of the device to enhance styling of the device. Other trim elements, such as aperture seals and weatherstripping, may be disposed along a flange and may prevent the ingress of water and/or contaminants into a compartment of the device.

Such trim elements are generally designed to meet a number of operational and manufacturing requirements. For example, it may be necessary for trim elements to remain pliable during both installation and operation, withstand repeated compression and expansion, and/or minimize noise and air flow disturbances over the device.

SUMMARY

A trim element for a device includes a substrate formed from a material and a cured film disposed on the substrate. The material has a first coefficient of static friction with respect to the device and a first coefficient of kinetic friction with respect to the device. The cured film is formed from a coating composition and has a second coefficient of static friction with respect to the device that is greater than the first coefficient of static friction, and a second coefficient of kinetic friction with respect to the device that is greater than the first coefficient of kinetic friction.

A device includes a body having a flange and a trim element disposed on the flange. The trim element includes a substrate formed from a material. The trim element also includes a cured film disposed on the substrate and formed from a coating composition. In addition, the device includes a component attached to the body and pivotable between an open position in which the component is spaced apart from the trim element and a closed position in which the component is disposed in fixed contact with the trim element. The material has a first coefficient of static friction with respect to the component and a first coefficient of kinetic friction with respect to the component. The cured film has a second coefficient of static friction with respect to the component that is greater than the first coefficient of static friction, and a second coefficient of kinetic friction with respect to the component that is greater than the first coefficient of kinetic friction.

In another embodiment, the trim element is disposed on the component. The component is pivotable with respect to the body between an open position in which the trim element is spaced apart from the body and a closed position in which the trim element is disposed in fixed contact with the body.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
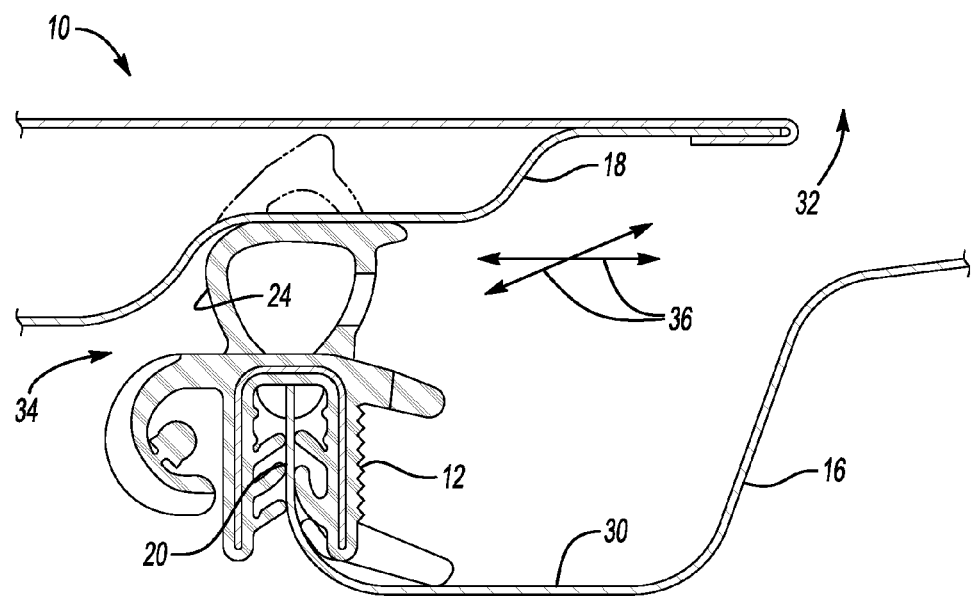
FIG. 1 is a schematic illustration of a cross-sectional view of a portion of a device including a body, a trim element, and a component.
Figure 2:
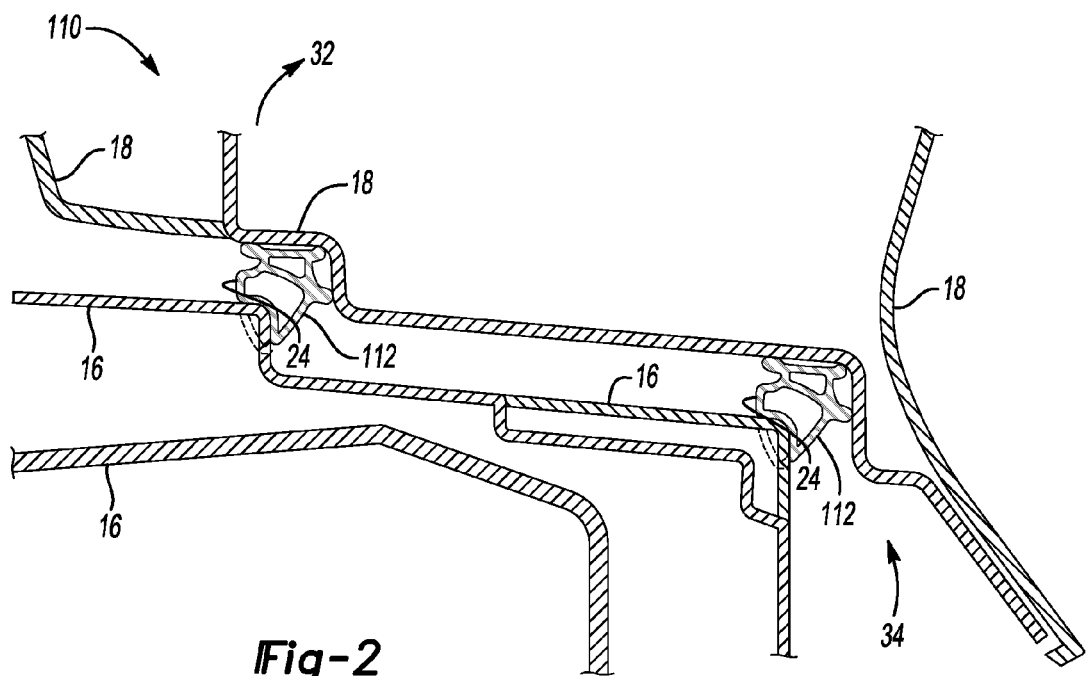
FIG. 2 is a schematic illustration of a cross-sectional view of a portion of another embodiment of the device of FIG. 1.

Referring to the Figures, wherein like reference numerals refer to like elements, a device 10, 110 including a trim element 12, 112 is shown generally in FIGS. 1 and 2. By way of non-limiting examples, the device 10, 110 and trim element 12, 112 may be useful for devices which require excellent noise dampening, attractive exterior styling, and optimal aerodynamics, such as automotive vehicles. In other examples, the device 10, 110 and trim element 12, 112 may be useful for aviation, construction, railway, and recreational vehicle applications. In particular, the trim element 12, 112 may minimize relative motion or translation between a body 16 of the device 10, 110 and a component 18 of the device 10, 110, and may therefore minimize a "stick/slip" condition, i.e., small relative motion between the trim element 12 and the component 18 or the body 16. Further, the trim element 12, 112 may minimize noise resulting from the stick/slip condition, which may be referred to as squeak and itch, and may also minimize marring or staining of the component 18 or body 16. In addition, the trim element 12 may cohere the body 16 and the component 18 so that the trim element 12 functions as a damper and joins the body 16 and the component 18 together as one mass. As used herein, the terminology "cohere" refers to a condition in which two members are united to form a whole.

Referring again to FIG. 1, the device 10 includes the body 16 or frame. The body 16 may include the primary structural members of the device 10 and may be configured for attaching to the component 18, which may pivot with respect to the body 16 as set forth in more detail below. The body 16 may be formed from, for example, a metal, a plastic, a fiber-reinforced plastic, a composite, combinations thereof, and the like. In one embodiment, the body 16 is formed from steel. In another embodiment, the body 16 is formed from aluminum. In yet another embodiment, the body 16 is formed from fiberglass. The body 16 may have excellent stiffness, and the body 16 may be coated with one or more electrocoat coating compositions, primer coating compositions, topcoat coating compositions, and/or clearcoat coating compositions. The body 16 may further include a flange 20.

The device 10 also includes the trim element 12 attached to the body 16. For example, as best shown in FIG. 1, the trim element 12 may be disposed on the flange 20 and may be a seal or weatherstrip. By way of additional non-limiting examples, the trim element 12 may be useful as an upper auxiliary seal, a rocker seal, a windshield lace, a body seal, a sunroof seal, and the like. In other embodiments, the trim element 12 may be, by way of non-limiting examples, a body molding, a badge, an exterior ornament, and the like, and may be disposed adjacent and in contact with the body 16.

Figure 3:
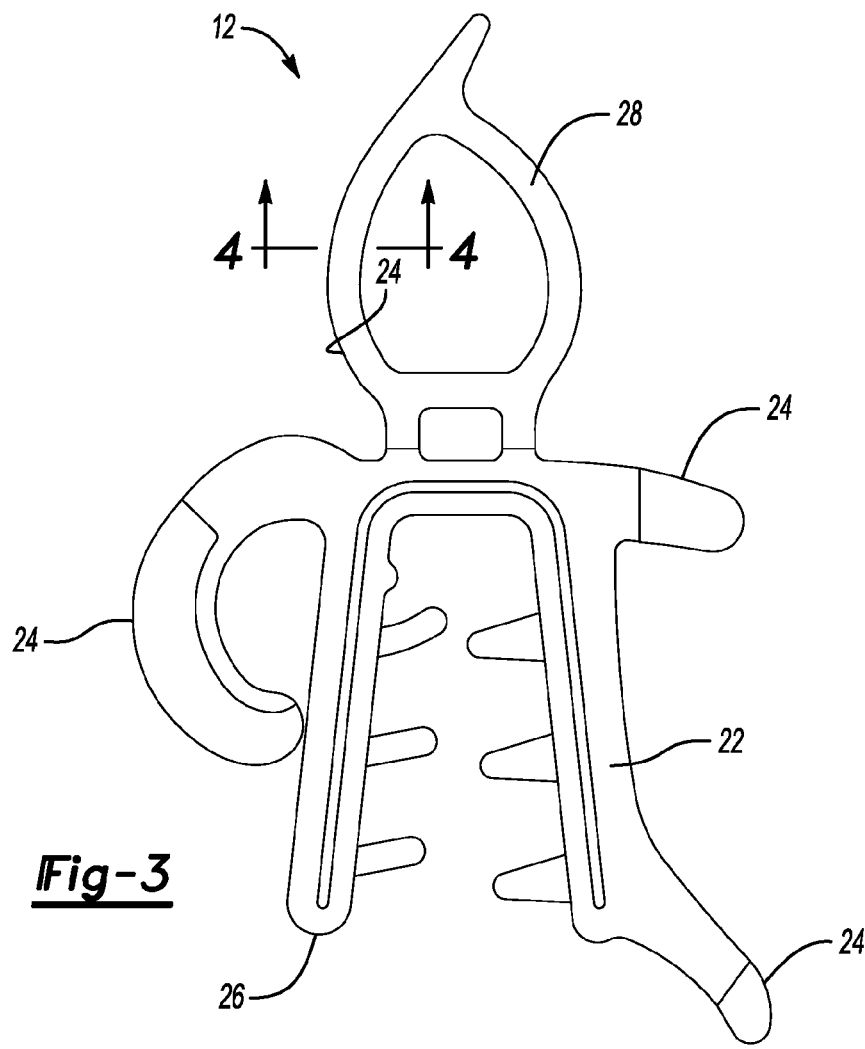
FIG. 3 is a schematic side view of the trim element of FIG. 1.
Figure 4:
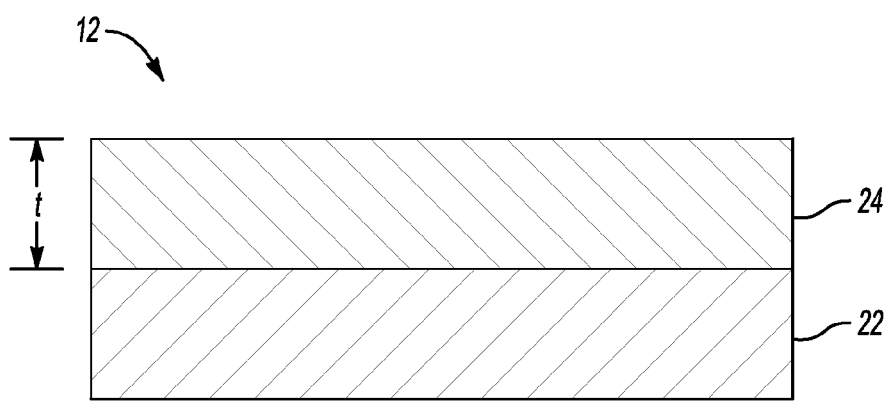
FIG. 4 is a schematic illustration of a cross-sectional view of the trim element of FIG. 3 taken along section lines 3-3.

Referring now to FIGS. 3 and 4, the trim element 12 includes a substrate 22 formed from a material. The material may be moldable or extrudable, such as an elastomer or plastic. Further, the material may be pliable, durable, and substantially resistant to freezing under device operating conditions. As non-limiting examples, the material may be ethylene propylene diene terpolymer (EPDM), a thermoplastic elastomer (TPE), a polyvinyl chloride (PVC), a thermoplastic polyolefin (TPO), acrylic styrene acrylonitrile (ASA), acrylonitrile butadiene styrene (ABS), combinations thereof, or another suitable polymer.

The material of the substrate 22 has a first coefficient of static friction with respect to the device 10, e.g., the body 16 or the component 18, and a first coefficient of kinetic friction with respect to the device 10, which together may be referred to as the first coefficient of friction. For example, for embodiments in which the material is ethylene propylene diene terpolymer (EPDM) and the body 16 or component 18 is formed from steel, the first coefficient of static friction with respect to the device 10 may be from about 4 to about 4.45, e.g., about 4.38, and the first coefficient of kinetic friction may be from about 1.5 to about 1.95, e.g., about 1.67. That is, the aforementioned values of the first coefficient of static friction and the first coefficient of kinetic friction describe a relationship of the force of friction between bare, uncoated ethylene propylene diene terpolymer (EPDM) and steel. It is to be appreciated that the values are dependent upon the materials that are disposed in contact with one another. For example, the frictional relationship describing two members formed from ethylene propylene diene terpolymer (EPDM) and aluminum, respectively, will have a different value of the first coefficient of static friction and the first coefficient of kinetic friction.

As used herein, the terminology coefficient of friction refers to a dimensionless scalar value which describes a ratio of the force of friction between two members and the force pressing the two members together. The terminology coefficient of static friction refers to a value that describes a limit after which motion occurs between two members previously at rest relative to one another due to static frictional forces from an interlocking of irregularities defined by respective contact surfaces of the two members. Therefore, for members at rest relative to one another, the coefficient of friction equals the coefficient of static friction.

The terminology coefficient of kinetic friction refers to a value that describes frictional resistance for two members which are in contact and moving with respect to one another and may be characterized as a measure of a sliding friction between the two members. Therefore, for members moving with respect to one another, the coefficient of friction equals the coefficient of kinetic friction. Further, the coefficient of static friction is generally larger than the coefficient of kinetic friction, and both the coefficient of static friction and the coefficient of kinetic friction depend on the surfaces or members in contact with one another.

Referring again to FIGS. 3 and 4, the trim element 12 further includes a cured film 24 disposed on the substrate 22 and formed from a coating composition. The coating composition may be referred to as a high coefficient of friction coating composition. Conversely, the coating composition may not be characterized as a low coefficient of friction coating composition. That is, since the cured film 24 may be disposed in contact with the body 16 as set forth above, the coating composition may not be selected to make the substrate 22 slippery with respect to the device 10, the body 16, or the component 18, but may rather be selected to minimize relative motion between the trim element 12 and the body 16 or the component 18 during device operation. More specifically, the cured film 24 formed from the coating composition has a second coefficient of static friction with respect to the device 10, e.g., the body 16 or the component 18, that is greater than the first coefficient of static friction, and a second coefficient of kinetic friction with respect to the device 10 that is greater than the first coefficient of kinetic friction. Stated differently, the cured film 24 may have a second coefficient of friction that is greater than the first coefficient of friction such that the cured film 24 does not allow slip between the body 16 and the trim element 12, yet is not abrasive to the body 16, e.g., does not mar any paint or coating disposed on the body 16. In other words, the cured film 24 increases the coefficient of friction of the substrate 22 and provides for a trim element 12 which grips the body 16 or the component 18 of the device 10. That is, the first coefficient of static friction and the first coefficient of kinetic friction describe the frictional relationship between the uncoated substrate 22 and the body 16 or component 18, whereas the second coefficient of static friction and the second coefficient of kinetic friction describe the frictional relationship between the trim element 12, i.e., the cured film 24 disposed on the substrate 22, and the body 16 or component 18.

For example, the second coefficient of static friction may be greater than or equal to about 4.5, or may be greater than or equal to about 5, or may be greater than or equal to about 6. Further, the second coefficient of kinetic friction may be greater than or equal to about 2, or may be greater than or equal to about 3, or may be greater than or equal to about 4, or may be greater than or equal to about 5, or may be greater than or equal to about 6.

The coating composition may be a liquid, a solid, or a mixture of a liquid and a solid. The coating composition may be, by way of non-limiting examples, an epoxy coating composition, e.g., a two-part coating composition including an epoxy resin which is cross-linked with a co-reactant or hardener; a polyurethane coating composition which may include one or more polyols crosslinked with one or more polyisocyanates; a polyurethane hybrid coating composition, such as polyurethane/polyurea coating compositions which may include one or more polyols in combination with one or more amines; a solventbased coating composition which may be characterized as a one-component system or a two-component system; a waterbased coating composition which may be characterized as a one-component system or a two-component system; a moldable coating composition such as an elastomer, a rubber, a silicone rubber coating, or an acrylic rubber coating; and combinations thereof. The cured film 24 may have the form of a skin of cured liquid coating composition and/or may have the form of a solid layer of molded or overmolded or co-molded or co-extruded elastomer. That is, in some embodiments, the coating composition may be moldable or overmoldable or co-moldable or co-extrudable with the substrate 22. In some embodiments, the coating composition may be an elastomer having a comparatively high coefficient of static friction and a comparatively high coefficient of kinetic friction, and may be suitable for overmolding onto the substrate 22 during co-molding operations. However, for embodiments including a moldable elastomer coating composition, the moldable elastomer coating composition may be selected to meet appearance and anti-freeze performance requirements. That is, the cured film 24 formed from the selected coating composition may be subject to repeated freeze-thaw cycles and repeated compression and rebound cycles, and may not mar, stain, or deposit a residue onto the body 16 or the component 18 during device operation. The coating composition may also include, for example, additives such as colorants and/or particles to increase friction between the body 16 or the component 18 and the cured film 24. It is to be appreciated that such additives, e.g., particles, may be non-abrasive to the body 16 and/or the component 18 such that the cured film 24 does not mar and/or stain the body 16, the component 18, and/or any paint or coating disposed on the body 16 or the component 18. Rather, the particles may merely increase friction between the body 16 or the component 18 and the cured film 24.

Referring again to FIG. 3, the substrate 22 may have an attachment portion 26 configured for attaching to the device 10 (FIG. 1), e.g., the flange 20 (FIG. 1) or the body 16 (FIG. 1), and a bulbous portion 28 extending from the attachment portion 26. The bulbous portion 28 may be configured for contacting the body 16 or the component 18, and the cured film 24 may be disposed on the bulbous portion 28.

Therefore, since the cured film 24 has a comparatively high coefficient of friction, the trim element 12 may not translate with respect to the body 16 or the component 18 during operation of the device 10. That is, although not shown, for embodiments in which the trim element 12 is a molding or exterior ornamentation, the body 16 may be disposed within a plane and the trim element 12 may not translate in a direction parallel to the plane, e.g., laterally or longitudinally. That is, the trim element 12 may not slip along the body 16 or the component 18. In particular, the cured film 24 formed from the high coefficient of friction coating composition may stick the trim element 12 to the body 16 or the component 18.

Referring again to FIG. 1, in other embodiments in which the trim element 12 is a seal or weatherstrip, the device 10 further includes the component 18 attached to the body 16. The component 18 is pivotable between an open position (denoted generally by arrow 32) in which the component 18 is spaced apart from the trim element 12 and a closed position (denoted generally at 34) in which the component 18 is disposed in fixed contact with the trim element 12. As used herein, the terminology fixed contact refers to a condition in which slip and relative movement between the component 18 and the trim element 12 is minimal or substantially non-existent. The component 18 may be a liftgate or tailgate; or may be a door, hood, or decklid; or may be a pane of glass for a window, windshield, moonroof, or sunroof. For instance, the component 18 may be a liftgate and the trim element 12 may be a seal disposed along the flange 20. The component 18 may pivot with respect to the body 16 to transition between the open position 32 and the closed position 34.

When the component 18 is disposed in the closed position 34, the cured film 24 may dampen movement of the component 18 with respect to the body 16. That is, the cured film 24 may cohere the component 18 to the body 16 when the component 18 is disposed in the closed position 34 such that the component 18, the trim element 12, and the body 16 form a single mass or unit. As such, referring again to FIG. 1, the body 16 may be disposed in a plane 30 and the component 18 may not be translatabale with respect to the trim element 12 in a direction (denoted generally by arrows 36) parallel to the plane 30 when the component 18 is disposed in the closed position 34.

Therefore, the trim element 12 may minimize relative motion or translation between the body 16 and the component 18, and may therefore minimize the "stick/slip" condition, i.e., small relative motion between the trim element 12 and the component 18 or between the trim element 12 and the body 16. Further, the trim element 12 may minimize noise resulting from the stick/slip condition, i.e., squeak and itch, and may also minimize marring or staining of the component 18. In addition, the trim element 12 may cohere the body 16 and the component 18 so that the trim element 12 serves as a damper and joins the body 16 and the component 18 together as one mass. Therefore, the cured film 24 may allow for a stiff device body 16 such that energy and vibrations from device travel over a road surface may be transferred to the body 16, the trim element 12, and the component 18 as a whole, rather than only to the component 18. Accordingly, relative movement between the body 16 and the component 18, and any accompanying noise due to such relative movement, may be minimized or prevented.

Referring now to FIG. 2, in another embodiment, the device 110 also includes the trim element 112 attached to the component 18. For example, the device 110 may be a vehicle, the component 18 may be a door of the vehicle, and the trim element 112 may be a seal or weatherstrip.

For this embodiment, the substrate 22 of the trim element 112 may have the attachment portion 26 configured for attaching to the component 18, and the bulbous portion 28 extending from the attachment portion 26. The bulbous portion 28 may be configured for contacting the body 16, and the cured film 24 may be disposed on the bulbous portion 28.

Referring again to FIG. 2, the device 110 further includes the component 18 attached to and pivotable with respect to the body 16. The component 18 is pivotable between an open position (denoted generally by arrow 32) in which the trim element 112 is spaced apart from the body 16 and a closed position (denoted generally at 34) in which the trim element 112 is disposed in fixed contact with the body 16. The component 18 may be a liftgate or tailgate; or may be a door, hood, or decklid; or may be a pane of glass for a window, windshield, moonroof, or sunroof. The component 18 may pivot with respect to the body 16 to transition between the open position 32 and the closed position 34.

When the component 18 is disposed in the closed position 34, the cured film 24 may dampen movement of the component 18 with respect to the body 16. That is, the component 18 may be cohered to the body 16 when the component 18 is disposed in the closed position 34 such that the component 18, the trim element 112, and the body 16 form a single mass or unit.

A method of forming the trim element 12, 112 includes applying the coating composition to the substrate 22. The coating composition may be applied to the substrate 22 in any suitable manner. For example, for embodiments in which the coating composition is a substantially liquid material, the substrate 22 may be dipped in the coating composition and/or the coating composition may be sprayed or rolled onto the substrate 22. Alternatively, for embodiments in which the coating composition is a moldable material, such as an elastomer, applying may include molding or overmolding or co-molding the substrate 22 and the coating composition. That is, the substrate 22 may be overmolded with the coating composition such that the coating composition is disposed on the substrate 22. More specifically, for such embodiments, the substrate 22 and the moldable coating composition may be co-molded together in the same mold cavity (not shown). Similarly, applying may include co-extruding the substrate 22 and the moldable coating composition, i.e., processing the substrate 22 and the moldable coating composition through the same extrusion apparatus or die. In addition, applying may include covering only a portion 28, e.g., the bulbous portion 28, of the substrate 22 with the coating composition. Alternatively, applying may include covering an entirety of the substrate 22 with the coating composition.

The method further includes curing the coating composition to form the cured film 24 disposed on the substrate 22 and thereby form the trim element 12, 112. The coating composition may be cured in any suitable manner. For example, the coating composition may be baked in a drying oven or dried at ambient temperature. Curing may deposit the cured film 24 onto the substrate 22 so that the cured film 24 has a thickness, t (FIG. 4), of from about 0.1 μm to about 50 μm based on required performance of the component 18.

While the best modes for carrying out the disclosure have been described in detail, those familiar with the art to which this disclosure relates will recognize various alternative designs and embodiments for practicing the disclosure within the scope of the appended claims.

The invention claimed is:

1. A device comprising:
a body having a flange;
a trim element disposed on the flange, wherein the trim element includes:
  a substrate formed from a material; and
  a cured film disposed on the substrate and formed from a coating composition; and
a component attached to the body and pivotable between an open position in which the component is spaced apart from the trim element and a closed position in which the component is disposed in fixed contact with the trim element;
wherein the material has a first coefficient of static friction with respect to the component and a first coefficient of kinetic friction with respect to the component;
wherein the cured film has a second coefficient of static friction with respect to the component that is greater than the first coefficient of static friction and a second coefficient of kinetic friction with respect to the component that is greater than the first coefficient of kinetic friction.

2. The device of claim 1, wherein the substrate has an attachment portion configured for attaching to the body and a bulbous portion extending from the attachment portion.

3. The device of claim 2, wherein the cured film is disposed on the bulbous portion.

4. The device of claim 1, wherein the body is disposed in a plane, and further wherein the component is not translatable with respect to the trim element in a direction parallel to the plane when the component is disposed in the closed position.

5. The device of claim 1, wherein the cured film dampens movement of the component with respect to the body when the component is disposed in the closed position.

6. The device of claim 1, wherein the component is cohered to the body when the component is disposed in the closed position.

7. The device of claim 1, wherein the component is a liftgate and the trim element is a seal disposed along the flange.

8. A device comprising:
a body;
a component attached to and pivotable with respect to the body;
a trim element disposed on the component, wherein the trim element includes:
  a substrate formed from a material; and
  a cured film disposed on the substrate and formed from a coating composition; and
wherein the component is pivotable with respect to the body between an open position in which the trim element is spaced apart from the body and a closed position in which the trim element is disposed in fixed contact with the body;
wherein the material has a first coefficient of static friction with respect to the component and a first coefficient of kinetic friction with respect to the component;
wherein the cured film has a second coefficient of static friction with respect to the component that is greater than the first coefficient of static friction and a second coefficient of kinetic friction with respect to the component that is greater than the first coefficient of kinetic friction.

9. The device of claim 8, wherein the substrate has an attachment portion configured for attaching to the component and a bulbous portion extending from the attachment portion.

10. The device of claim 9, wherein the cured film is disposed on the bulbous portion.

11. The device of claim 8, wherein the component is cohered to the body when the component is disposed in the closed position.

12. The device of claim 8, wherein the device is a vehicle, the component is a door, and the trim element is a seal.

13. A trim element for a device, the trim element comprising:
a substrate formed from a material, wherein the material has a first coefficient of static friction with respect to the device and a first coefficient of kinetic friction with respect to the device; and
a cured film disposed on the substrate and formed from a coating composition, wherein the cured film has a second coefficient of static friction with respect to the device that is greater than the first coefficient of static friction and a second coefficient of kinetic friction with respect to the device that is greater than the first coefficient of kinetic friction.

14. The trim element of claim 13, wherein the second coefficient of static friction is greater than or equal to about 4.5.

15. The trim element of claim 13, wherein the second coefficient of kinetic friction is greater than or equal to about 2.

16. The trim element of claim 13, wherein the second coefficient of static friction is greater than or equal to about 5.

17. The trim element of claim 16, wherein the second coefficient of kinetic friction is greater than or equal to about 5.

18. The trim element of claim 13, wherein the coating composition is an epoxy.

19. The trim element of claim 18, wherein the material is an elastomer.

20. The trim element of claim 19, wherein the material is ethylene propylene diene terpolymer.

* * * * *